(No Model.) 2 Sheets—Sheet 1.

W. A. SEIFERT.
MUSICAL INSTRUMENT.

No. 517,196. Patented Mar. 27, 1894.

Witnesses:
E. B. Bolton
Jno. B. Barker

Inventor:
Wilhelm Alfred Seifert
By Richard & Leo
his Attorneys

THE NATIONAL LITHOGRAPHING COMPANY,
WASHINGTON, D. C.

(No Model.)  2 Sheets—Sheet 2.
W. A. SEIFERT.
MUSICAL INSTRUMENT.
No. 517,196. Patented Mar. 27, 1894.
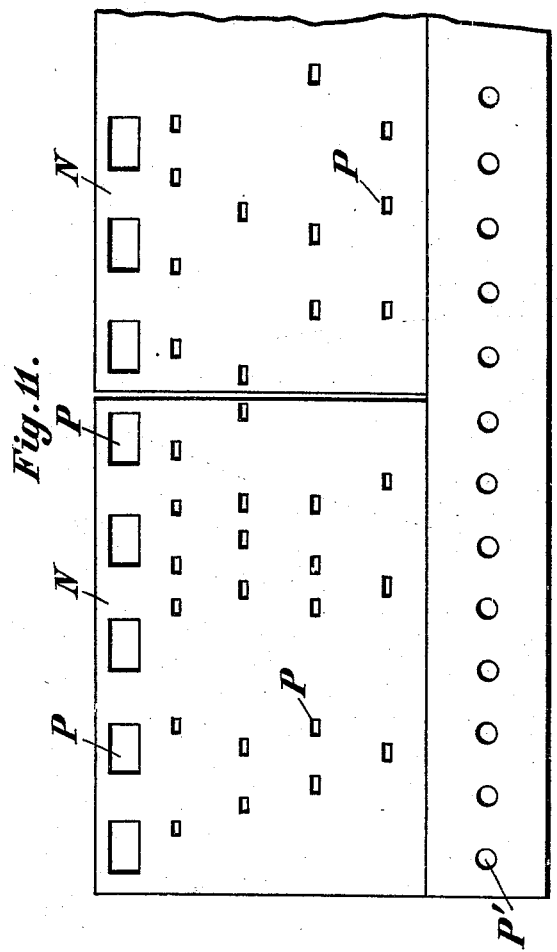
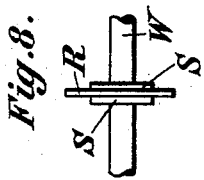
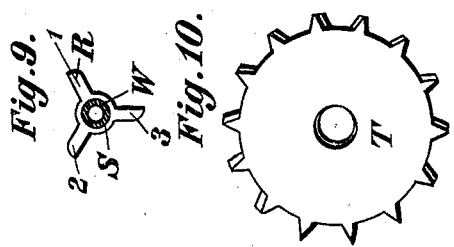

UNITED STATES PATENT OFFICE.

WILHELM ALFRED SEIFERT, OF LEIPSIC-PLAGWITZ, GERMANY.

MUSICAL INSTRUMENT.

SPECIFICATION forming part of Letters Patent No. 517,196, dated March 27, 1894.

Application filed August 16, 1893. Serial No. 483,187. (No model.)

*To all whom it may concern:*

Be it known that I, WILHELM ALFRED SEIFERT, of Leipsic-Plagwitz, in the Kingdom of Saxony and German Empire, have invented new and useful Improvements in Musical Instruments, of which the following is a specification, reference being had therein to the accompanying drawings.

Figure 1:
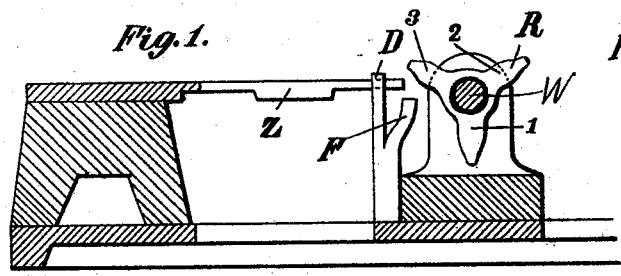
Figure 2:
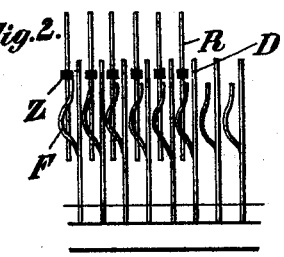
Figure 3:
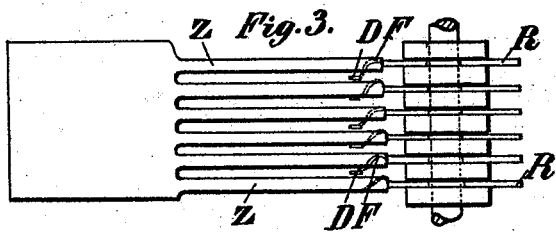
Figure 4:
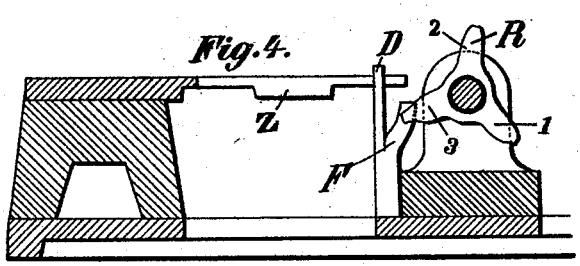
Figure 5:
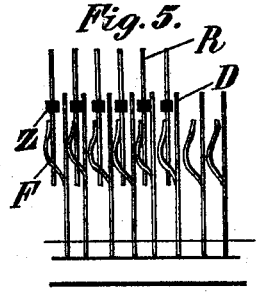
Figure 6:
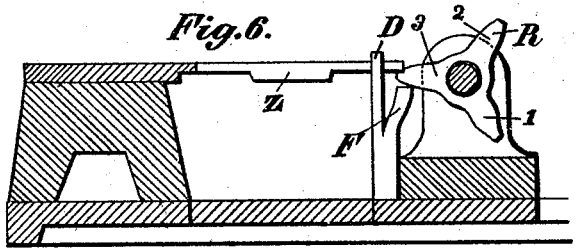
Figure 7:
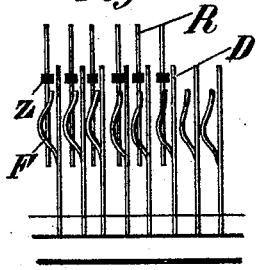

In the drawings Figure 1, shows the picker wheel and the vibrating tongues in side elevation. Fig. 2, is a front view of the same; Fig. 3, a plan; Fig. 4, a view similar to Fig. 1, with the parts in different position; Fig. 5, a front view of Fig. 4; Fig. 6, a side view with the parts in another position; Fig. 7, a front view of Fig. 6; Figs. 8 and 9 details of the picker wheels; Fig. 10, the feed wheel for the tune sheet; Fig. 11, a plan view of the perforated tune sheet.

The shaft W is constantly revolved and it has fixed there to the friction disks S S between which the picker wheels R are arranged loosely on the shaft, but in frictional contact with the disks S.

$z$ are the vibrating blades for producing the tone when operated by the teeth 1, 2, 3 of the picker wheels R.

The tune sheet N, Fig. 11, is moved over the picker wheels by the toothed feed wheel T, Fig. 10, engaging the openings P' in the sheet and this tune sheet engaging the teeth of the picker wheels holds the same stationary despite the revolution of the shaft W until one of the openings P in the tune sheet comes above the tooth of the picker wheel and then the wheel will revolve as it is now released and is in frictional contact with the constantly revolving disk S on the shaft W, and thus the picker will strike one of the vibrating tongues and make the tone. I have provided a spring damper device D F to act in conjunction with the picker wheel to dampen the vibration or tone after the vibrating plate $z$ has been operated. This damper consists of two arms D F the former of which is arranged to bear laterally on tongue $z$ when pressed aside and the latter being arranged in the path of teeth or the picker wheel so that said picker wheel will force the same to one side in order to make the arm D bear on the tongue, this action taking place intermediate of the contacts of the picker wheel with the tongue. After being moved laterally by the picker wheel the damper returns to normal position by reason of its own resilience.

I claim—

1. In combination, the constantly revolving shaft W, the friction disks S thereon, the picker wheels R arranged between said disks, and loose on the shaft the tongues $z$ arranged to be vibrated by the teeth of the picker wheels, and the perforated tune sheet with means for moving the same over and in contact with the picker wheels, substantially as described.

2. In combination, the tongues $z$, the picker wheels having teeth to engage the same, the means in frictional contact with the picker wheels tending to move the same constantly and the perforated tune sheet with means for moving the same over in contact with the picker wheels, substantially as described.

3. In combination, the tongues $z$, the picker wheels having teeth to vibrate the same and the damper device comprising the resilient strip having the two arms D F one of which is in position to be operated laterally by the picker teeth and the other is arranged to bear on the tongue, substantially as described.

In witness whereof I hereunto set my hand in presence of two witnesses.

WILHELM ALFRED SEIFERT.

Witnesses:
 CARL BORNGRAEBER,
 PAUL KAST.